(No Model.) 2 Sheets—Sheet 1.

J. C. OLIVER.
GAS MACHINE.

No. 593,682. Patented Nov. 16, 1897.

Attest
Arthur Kline
Leo H. Beck.

Inventor
James C. Oliver
by C. Spengel att.

(No Model.)　　　　　　　　　　　　　　　　　　　2 Sheets—Sheet 2.
J. C. OLIVER.
GAS MACHINE.
No. 593,682.　　　　　　　　　　Patented Nov. 16, 1897.
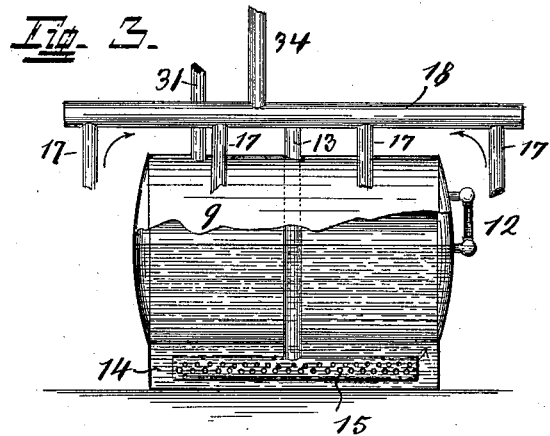
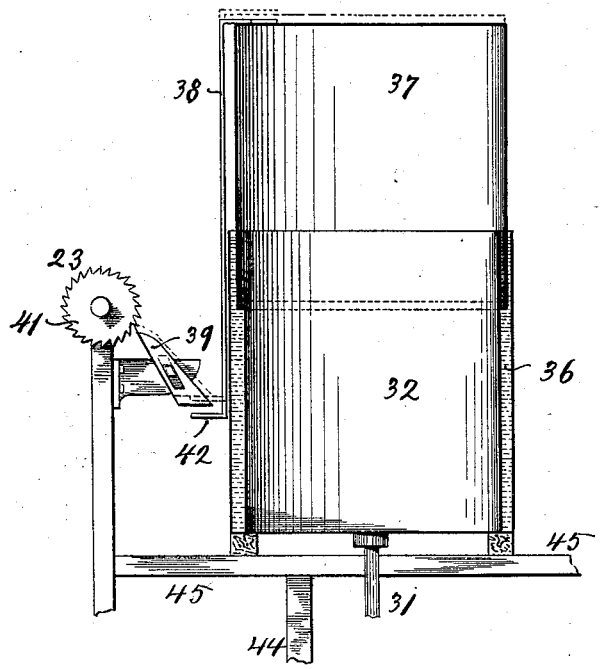

UNITED STATES PATENT OFFICE.

JAMES C. OLIVER, OF LEXINGTON, KENTUCKY.

GAS-MACHINE.

SPECIFICATION forming part of Letters Patent No. 593,682, dated November 16, 1897.

Application filed March 5, 1896. Serial No. 581,937. (No model.)

*To all whom it may concern:*

Be it known that I, JAMES C. OLIVER, a citizen of the United States, residing at Lexington, Fayette county, State of Kentucky, have invented certain new and useful Improvements in Gas-Machines; and I do declare the following to be a full, clear, and exact description of the invention, such as will enable others skilled in the art to which it appertains to make and use the same, attention being called to the accompanying drawings, with the reference-numerals marked thereon, which form a part of this specification.

This invention relates to improvements in machines for manufacturing gas of the kind which is produced for illuminating purposes by the vaporization of a suitable volatile hydrocarbon liquid, like gasolene, for instance.

The evaporated liquid is reduced to its proper consistency for burning by atmospheric air, which is added in a manner to become thoroughly saturated and intermixed therewith. This air is introduced under pressure, thereby furthering the evaporation of the oil, and also furnishing the power required to force the gas into and through the service-pipes.

The feature of my invention relates to a construction whereby the action of the mechanism producing the air-pressure is made automatic and controlled by the reservoir containing the ready gas in this manner that such action ceases when the reservoir is filled and resumes operation when the supply decreases.

In the following specification, and particularly pointed out in the claim, is found a full description of my invention, its operation, parts, and construction, which latter is also illustrated in the accompanying drawings, in which—

Figure 1:
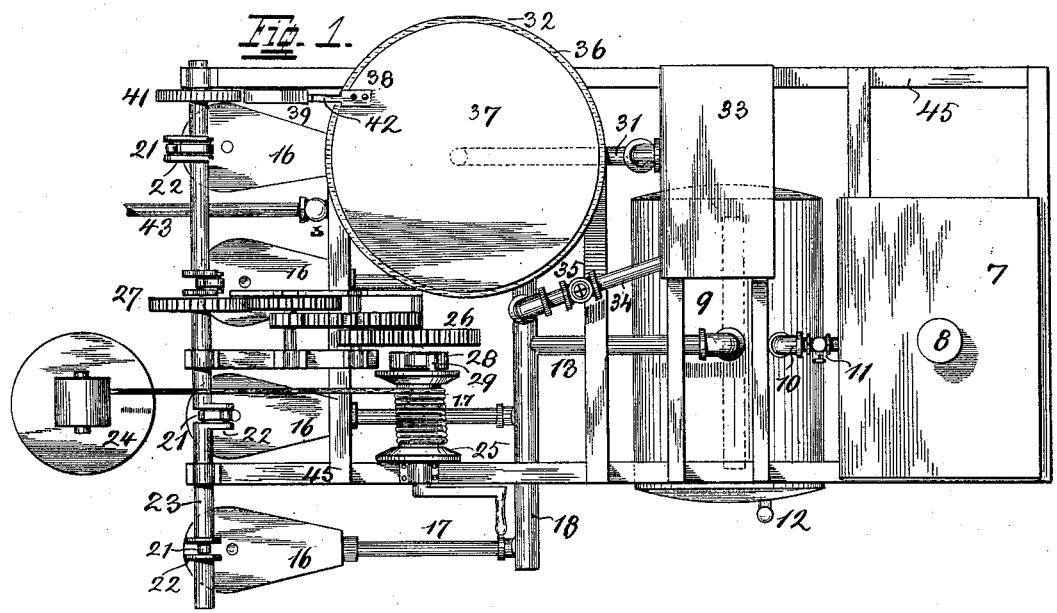
Figure 2:
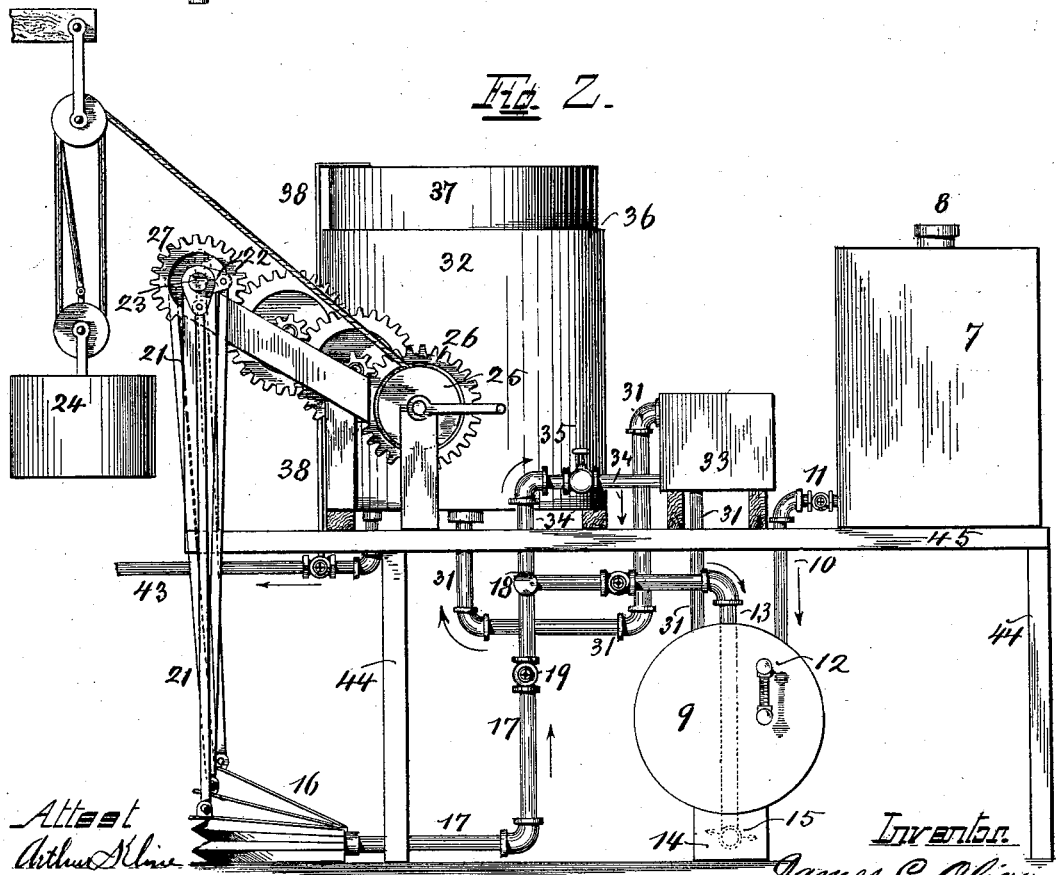

Figure 1 is a top view, and Fig. 2 an elevation, of the whole machine complete. Fig. 3 is a longitudinal section of the vessel or carbureter in which the vaporization and aeration of the gas-producing agent takes place. Fig. 4 is a sectional view of the reservoir containing the manufactured gas, showing also the construction of the means whereby it controls by the stage of its contents the operation of the mechanism which forces air into the carbureter and thereby induces the vaporization of the oil therein for the purpose of augmenting the gas-supply.

7 is the reservoir, containing the supply of the vapor-producing liquid or oil, which it may receive through a fill-opening 8. From it, whenever required, a certain quantity is admitted to a cylindrical vessel 9, closed airtight, the transmission being by a pipe 10, controlled by a cock 11. A glass gage 12 shows the stage of the liquid within vessel 9 and indicates when replenishing is required. The gas is produced in this vessel by the vaporization of the oil under addition of air, whereby this latter becomes charged with such vapor, and for which reason the vessel may be properly termed a "carbureter." In detail this process consists principally of air under pressure being caused to enter through a pipe 13, which passes vertically down through the vessel and terminates in a pocket 14, formed lengthwise at the under side of the vessel of which it is a part. Within this pocket pipe 13 connects with a horizontal pipe 15, which passes lengthwise through said pocket and, being otherwise closed, has a number of small orifices through which the air discharges directly into the oil. It will be seen that this air before it can separate again from the oil above the level of the latter must pass through the whole volume of the same and becomes thoroughly intermingled and saturated therewith respectively with the vapor thereof. It will also be noticed that in supplying the carbureter the oil from the bottom of the storage-tank is used first, whereby the heavier parts of the same, which do not readily vaporize, are prevented from accumulating and settling, owing to the frequent disturbances at the bottom of the tank, incident to the opening of the cock and flow of the oil. This is a great advantage toward producing gas of unvarying quality and preventing settlements of residues, which in time become so thick and heavy as to be unable to vaporize and impair the successful operation of the carbureter until they are removed. In the carbureter itself this accumulation is prevented by the agitation of the air-currents, which enter the same at the bottom where the oil is the heaviest. The pressure required to move the air is produced by a number of air compressors or pumps, preferably bellows 16 in this case, which all discharge through pipes 17 into a manifold 18, from which pipe 13 starts over to the carbureter. Check-valves 19 are provided in each of pipes 17 to prevent the air from backing out again through any of such pipes at times when the compressors are on their suction strokes. For their operation these bellows are each connected to a pitman 21, which is reciprocated by a crank 22, projecting from and rotated by a shaft 23, on which they are arranged at angles ninety degrees apart in rotation. The shaft is rotated by the descent of a weight 24, supported on a rope which first passes around sheaves in pulley-blocks to multiply its length, and then to a drum 25, around which it is wound and which is in operative connection with the first one, 26, of a train of gear-wheels, the last one, 27, of which is mounted on shaft 23 and all of which are rotated by reason of their connection to the drum and the rotation of the same, caused by the unwinding of the rope therefrom under the stress of the descending weight. The object of this gear-train is to attain an increased speed for the crank-shaft against the speed of the drum, which when slow lengthens the time during which the device remains operative and lessens the frequency of rewinding the rope. This object is further aided by the number of sheaves in the pulley-blocks, whereby the time before the weight reaches the limit of its drop is considerably lengthened. To permit the rewinding of the rope without causing all the air-compressor machinery to operate, the winding-drum and the first cog-wheel 26 are independently mounted, either by being on different shafts or by one being loosely mounted on the same shaft. In this case this first cog-wheel may be considered as being loosely mounted on the drum-shaft and has connected to it a ratchet-wheel 28, which is engaged by a pawl 29, carried on the outside of one of the flanges of drum 25. This pawl is inactive in reverse direction to the unwinding of the drum, therefore not affecting the first cog-wheel 26 when the drum is wound, but becomes active when the rope is unwinding from the drum, thereby starting the rotation of the gear-wheels. No novelty is claimed for this construction and the same may be varied as found expedient.

The ready gas as produced in the carbureter passes from the same through a pipe 31 to the gas-reservoir 32, being impelled by the pressure of the air which enters the carbureter. During this passage the gas may be passed through reducer 33, which is substantially a closed vessel which pipe 31 enters at one point and leaves it at another. 34 is another pipe controlled by a cock 35 and connects this reducer with the pipe system containing air under pressure.

The object of the reducer is to add more air to the gas when after it has left the carbureter it is found to be "too rich," whereby is meant containing too much carbon. When this additional air is not required, cock 35 remains closed and the gas simply passes in the reducer and out again, the latter forming then merely part of pipe 31. This latter enters the bottom of reservoir 32, which is provided with an extra inner wall some distance apart from the outer one to form a space 36 to be filled with a liquid, preferably non-freezable, like glycerin. Another vessel 37, of substantially the same shape as reservoir 32, but sufficiently smaller to pass into space 36 and open at one end, is immersed with its open end downward into the liquid filling such space 36, thereby forming a top or cover to the reservoir. As the supply increases cover 37 rises within space 36, the liquid in the latter forming a seal and preventing escape of gas. When a certain quantity of gas has accumulated inside of reservoir 32 and below cover 37, the further rise of this latter is checked by mechanism which at the proper time acts automatically upon the crank-shaft in a manner to stop its rotation, which operates the compressors. This causes a cessation of the live pressure from the carbureter toward the gas-reservoir and prevents further rise of cover 37. The mechanism whereby this is accomplished consists of an arm 38, projecting out and down from the cover and shaped to be adapted when in certain positions to act against the heel of a sliding pawl 39, located in proper position for the purpose of bringing the same in engagement with a ratchet-wheel 41, rigidly secured to shaft 23. Ordinarily this pawl is out of engagement with the ratchet-wheel, but when the reservoir approaches a full stage the rising cover carries also arm 38 with it and causes a projection 42 thereon to raise the pawl against the ratchet-wheel in a manner to stop rotation of the latter. This, as a matter of course, arrests also the motion of crank-shaft 23 and stops the action of the compressors. As the supply is drawn from the pressure decreases, cover 37 sinks back, causing also projection 42 on arm 38 to move away from below pawl 39, which now slides out of contact with ratchet-wheel 41 and, releasing the same, permits the machinery to resume action. 43 is the service-pipe, and, starting from the reservoir, carries the gas to the place of its consumption. All the parts are properly supported on a suitable framework, consisting of posts 44 and sills 45.

It will be noticed that I do away with complicated constructions usually found in these machines for the purpose of vaporizing the oil or for furnishing the necessary air-pressure, the resulting simplicity lessening the manufacturing cost and increasing the reliability of the machine. This latter feature is materially enhanced by the fact that the use of water is entirely dispensed with, particularly in connection with the air-compressors, for which reason freezing temperature does not interfere with the operation of the machine.

Having described my invention, I claim as new—

In a gas-machine, the combination of an oil-tank 7, a carbureter 9, connected thereto, a series of air-compressors to supply air under pressure to the carbureter to which they connect by pipes, a reservoir 32 which receives the ready gas from the latter having the cover 37 adapted to rise with the influx of such gas, a shaft operatively connected to the air-compressors for the purpose of their actuation, mechanism whereby said shaft is rotated, a ratchet-wheel 41 mounted on it, a sliding pawl 39 normally out of engagement with said ratchet-wheel, a projecting arm connected to the movable cover and traveling in line with the pawl 39 and adapted to bring it into engagement with ratchet-wheel 41 for the purpose described.

In testimony whereof I hereunto affix my signature in presence of two witnesses.

JAMES C. OLIVER.

Witnesses:
  C. SPENGEL,
  ARTHUR KLINE.